Dec. 13, 1927.
L. C. HUCK ET AL
1,652,479
BRAKE FOR AUTOMOBILE VEHICLES
Filed Sept. 25, 1920
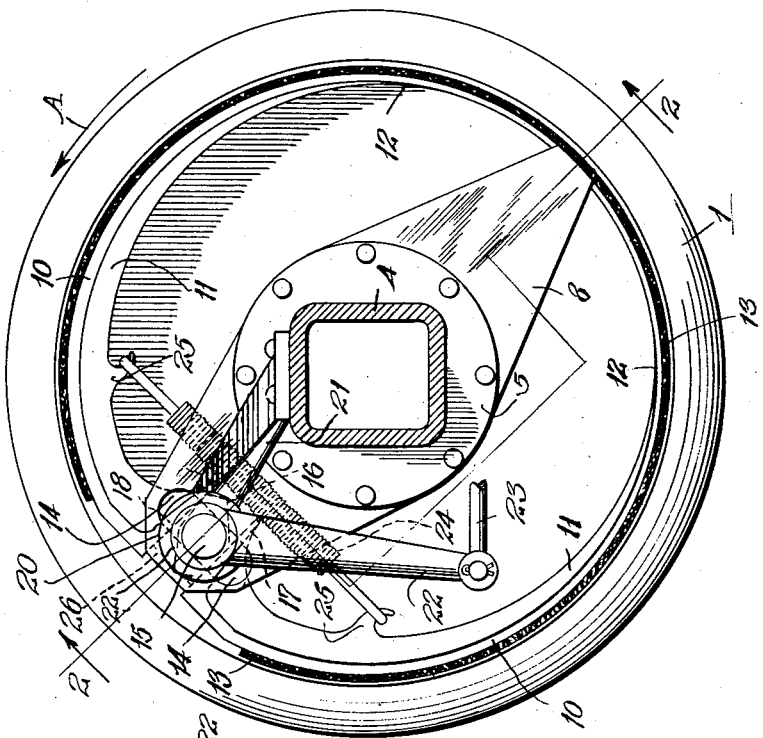
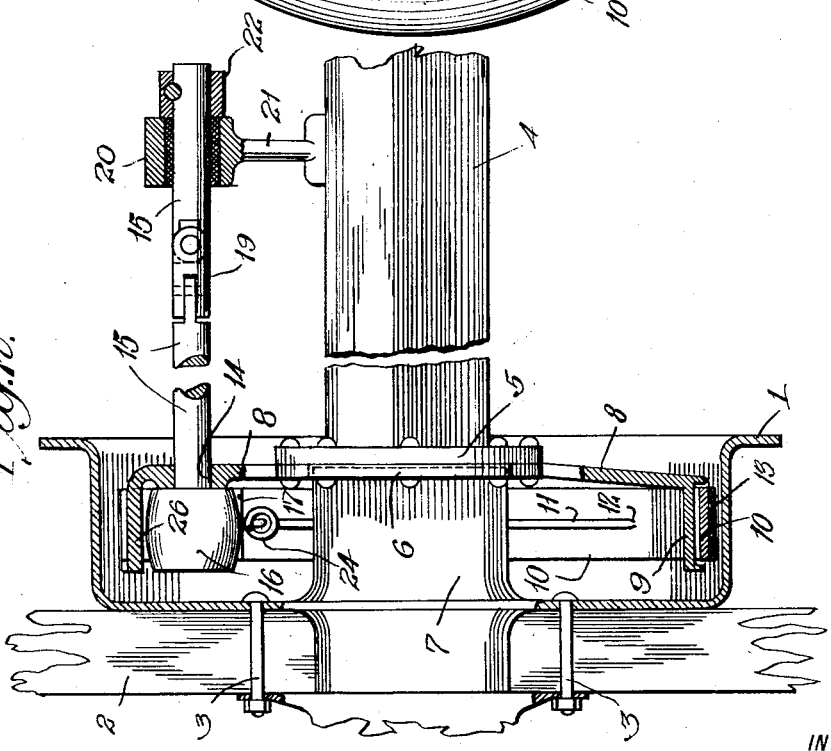
INVENTOR
Louis C Huck
and
Martin Twight
BY Wallace R. Lane.
ATTORNEYS Patented Dec. 13, 1927.

1,652,479

UNITED STATES PATENT OFFICE.

LOUIS C. HUCK AND MARTIN TWIGHT, OF CHICAGO, ILLINOIS, ASSIGNORS TO HUCK AXLE CORPORATION, OF CHICAGO, ILLINOIS, A CORPORATION OF ILLINOIS.

BRAKE FOR AUTOMOBILE VEHICLES.

Application filed September 25, 1920. Serial No. 412,841.

Our invention relates to improvements in brakes for automotive vehicles, and more particularly to the operating mechanism of brakes used in connection with the wheels of such vehicles.

Among the objects of our invention are to provide a device of the type described which has means for producing and sustaining a given braking effort, with the application of a relatively small force on the part of the operator; to provide a brake of simple construction adapted to produce the result stated above; to provide a brake requiring less frequent adjustment than some of the brakes now on the market; to provide a device of the type described for accomplishing the object stated in which the braking action will be uniform, rather than one which will exert a savage or sudden gripping action; to provide a device of the type described that is strong and durable in construction and not likely to get out of order easily; to provide a device of the type described which will incorporate the advantages of the two general types now in use, and eliminate the respective disadvantages of these types, said two types being the cam and toggle action brakes, respectively; and such further objects, advantages and capabilities as will later more fully appear.

Both of the above mentioned types have proved unsatisfactory due to the following disadvantages:

The disadvantage of the toggle action is that it is a very complicated mechanism and has a great many moving parts which cannot be lubricated and that it is therefore subject to undue wear.

The disadvantage of the cam action used prior to our invention is the fact that the cam, besides having to exert a force necessary to expand the brake shoe and bring about friction between the shoe and brake drum, has to exert a force sufficiently great to overcome the braking reaction; the result being that the operator must exert a great deal of effort in merely overcoming the torque imposed on the cam due to the braking reaction. Furthermore, to bring about the necessary braking action with a reasonable amount of effort on the operator's part, a large mechanical advantage or leverage has to be used. This is unsatisfactory as the brake will then require frequent and very accurate adjustment as a comparatively small amount of wear in the brake lining will cause a large change in the position of the member to which the operator applies the force.

Taking now the advantages of the two types. The advantage of the toggle brake as indicated in the preceding paragraph is the fact that it allows the braking reaction to be taken entirely on a stop rigidly fastened to the axle housing and that, therefore, a smaller effort on the operator's part will bring about a greater braking action and that the desired braking action can be obtained with reasonable effort on the operator's part with less mechanical advantage, requiring less frequent and less accurate adjustment.

The advantage of the cam brake is its simplicity and freedom from wear in the brake operating parts. As mentioned before, the object of our invention is to combine the advantages and eliminate the disadvantages of the two devices herein before described, i. e. to provide a brake having the simplicity of the cam action and yet to have a construction such as to provide for taking the entire braking reaction on a stop rigidly fastened to the brake anchor or housing, bringing about the desired results of less effort on the operator's part and less frequent adjustment.

Our invention further resides in the combination, construction, and arrangement of parts illustrated in the accompanying drawings, and while we have shown therein a preferred embodiment, we desire the same to be understood as illustrative only and not as limiting our invention.

Our invention is illustrated in the accompanying drawings, forming part of this specification in which Figure 1 is a side view of the interior of a brake drum, the axle housing being shown in section, and Figure 2 is a section substantially along the line 2—2 of Figure 1.

In carrying out our invention, we provide a brake drum 1 which is secured to a wheel 2 in any suitable manner, as by bolts 3. The axle housing 4 has a flange 5 which is bolted to the circular central portion 6 of a plate 8, which constitutes the brake spider or anchor of the device. The portion 6 has a central opening to receive the end of the hub 7 of the wheel which projects into the opening a short distance, but which does not touch the plate. The plate 8 is formed at one end with an integral laterally extending guide 9 for the brake shoe 10. The latter on its inner side is provided with ribs 11 which gradually increase in depth from the points 12 (see Figure 1) toward the spaced ends of the brake shoe. The purpose of these ribs is to stiffen the brake shoes, and to thus limit their wrapping action. These ribs are so proportioned as to insure a uniform braking action to eliminate any tendency of sudden or gripping action. A brake lining 13 of any suitable material is provided on the brake shoe. The plate 8 has a slot 14 formed to receive and guide a cam shaft 15 which bears a cam 16. The latter is arranged to bear against the inwardly turned flanged ends 17 and 18 of the shoe 10. The cam shaft 15 is rotatably supported in a bearing 20 carried by a bracket 21 secured to the axle housing 4, and a flexible joint in cam shaft 15 or other means are provided to allow a bodily movement of the cam and cam shaft along the slot 14. To the end of the cam shaft 15 is keyed the lever 22 which is connected to the pull rod 23 which may be operated in any suitable manner. A spring 24 has its opposite ends attached to hooks 25 on the brake shoe 10.

When the lever 22 is in its normal position, the cam 16 is turned so as to permit the spring 24 to hold the shoe away from the drum and permit the latter to revolve freely. When, however, the rod 23 is pulled, as by pressing a foot pedal, (not shown), the cam 16 is revolved so as to spread apart the ends 17 and 18 of the brake shoe. If the brake drum is rotating in the direction shown by the curved arrow A in Figure 1, then there is a tendency to rotate the brake shoe in the same direction, since the shoe has expanded to bring the brake band into gripping position, but this rotation of the brake shoe is prevented by the stop 26 which is part of the plate 8, as shown in Figure 2, the end 18 bearing against this projection. The cam 16, however, and the cam shaft 15 will be free to be shifted along the slot 14, allowing the stop 26 to carry the entire force due to the braking reaction relieving the cam shaft of the torque which would result if the cam were constructed to carry the braking reaction. The flexible joint 19 is provided for permitting the movement of the cam shaft along the slot. This movement is a relatively slight one, but it is entirely sufficient to permit that portion of the brake shoe bearing the end 18 (see Figure 1) to come in contact with shoulder 26, whenever the brake band comes in contact with the drum. Of course, if the drum is revolving in the opposite direction, the cam shaft will be moved toward the end of the slot adjacent to the end member 18, while the end member 17 will be brought up against the shoulder 26 which prevents rotation of the brake shoe, but which permits the shoe to expand to grip the drum in the manner described.

In the ordinary cam action brake the cam is not free to yield to the braking reaction and therefore to obtain a given braking effort, the operator has to exert a force, not only sufficiently great to bring about the necessary pressure between the brake lining and the brake drum, but he also has to exert a force sufficiently great to overcome the torque imposed on the cam shaft by the braking reaction.

It will be seen that this construction will greatly relieve the fatigue of driving, especially among those who must necessarily use the brake constantly. The device is simple in construction, and it eliminates a great part of the wear on the cam and cam shaft bearings. Furthermore, compared to the conventional cam brake, a given braking effort can be obtained with less mechanical advantage, the applied force being the same in both cases, or, a greater braking force can be attained with a given mechanical advantage. The special advantage of the former of these is that for a given wear on the brake lining the position of the member to which the force is applied, such as brake pedal or hand lever, will be changed far less, requiring less frequent adjustment; of the latter, that the operator will be less fatigued.

It is of course understood that the specific description of structure set forth above may be departed from without departing from the spirit of our invention as set forth in this specification and the appended claims.

Having now described our invention, we claim:

1. In a brake mechanism for automotive vehicles, a circular drum secured to a wheel of the vehicle, an axle housing, a plate secured to said axle housing and having a laterally extending guide member at one end, the opposite end of said plate having a stop member and being provided with a slot adjacent to said stop member, a bracket carried by the housing, a cam shaft journalled in said bracket at one end and extending through the slot of said plate at the other end, a cam carried by said cam shaft, a generally circular brake shoe having extending end portions spaced apart, said cam being disposed between said end portions and being arranged to engage them, and a spring for normally forcing said ends toward one another.

2. In a brake mechanism, a brake drum, a shoe element disposed within said drum, means to apply pressure between the shoe element and drum, said shoe element having a portion adjacent the end of the shoe receiving the anchor reaction formed to have a section of increasing rigidity toward the end of the shoe receiving the anchor reaction to limit the wrapping action of the shoe element.

3. In a brake mechanism, a brake drum, a shoe element disposed within said drum, means to apply pressure between the shoe element and drum, a stationary anchor member to limit the rotation of the shoe element, said shoe element having a portion adjacent the end of the shoe receiving the anchor reaction formed to have a section of increased rigidity to limit the wrapping action of the shoe element.

4. In a brake mechanism, a brake drum, a shoe element disposed within said drum, said shoe element having ends spaced apart during braking action, means to bring the shoe element into frictional contact with the brake drum, stop means to prevent rotation of the shoe element with the drum, means to permit the braking reaction to be carried entirely by said stop means, said shoe element having a portion adjacent its end contacting the stop means formed to have a section of increasing rigidity toward the end of the shoe element contacting the stop means to limit the wrapping action of the shoe element.

5. In a brake mechanism, a brake drum, a shoe disposed within the drum and having ends movable away from each other during braking action, means to spread said ends apart relative to each other to apply braking pressure between the shoe and the drum, and a rib on said shoe, said rib increasing in depth toward the end of the shoe receiving the anchor reaction to increase the rigidity of the shoe toward said last mentioned end and limit the wrapping action of the shoe.

6. In a brake mechanism, a brake drum, a shoe disposed within the drum, the shoe being generally of band formation and having spaced ends, and a rib on said shoe extending from one end to a point removed from the end, said rib decreasing in depth from the shoe end to said removed point to limit the wrapping action of the shoe.

7. In a brake mechanism for automotive vehicles, a brake drum, a shoe disposed within the drum, the shoe being generally of band formation and having spaced ends, and a rib on the inner face of each end portion of the shoe, each of said ribs decreasing in depth from the shoe end to stiffen the shoe at desired portions and limit the wrapping action.

8. In a brake mechanism, a brake drum, a shoe with ends spaced apart in said drum, anchor means disposed to receive reactions from either one of said ends, substantially differentially acting means to spread the shoe ends apart, said shoe having a section of increased rigidity from a point in the circumference of the shoe toward the part of the shoe contacting with the aforementioned anchor to limit the wrapping action of the shoe.

9. In a brake mechanism, a brake drum, a brake anchor, a flexible band disposed within said brake drum and having its flexibility limited at the part adjacent the point of reaction with the brake anchor to limit the amount of wrap of the flexible band.

In witness whereof, we hereunto subscribe our names to this specification.

LOUIS C. HUCK.
MARTIN TWIGHT.